US008879212B1

(12) United States Patent
Huber

(10) Patent No.: US 8,879,212 B1
(45) Date of Patent: Nov. 4, 2014

(54) DISK DRIVE SUSPENSION ASSEMBLY WITH FLEXURE HAVING DUAL CONDUCTIVE LAYERS WITH STAGGERED TRACES

(71) Applicant: Western Digital Technologies, Inc., Irvine, CA (US)

(72) Inventor: William D. Huber, Hollister, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/065,329

(22) Filed: Oct. 28, 2013

Related U.S. Application Data

(60) Provisional application No. 61/869,165, filed on Aug. 23, 2013.

(51) Int. Cl.
*G11B 21/16* (2006.01)

(52) U.S. Cl.
USPC ...................................... 360/245.9

(58) Field of Classification Search
USPC ...................................... 360/245.9
See application file for complete search history.

(56) References Cited

U.S. PATENT DOCUMENTS

| | | | |
|---|---|---|---|
| 3,617,952 | A | 11/1971 | Beech |
| 4,344,093 | A | 8/1982 | Huber |
| 4,656,533 | A | 4/1987 | Sakai et al. |
| 4,819,094 | A | 4/1989 | Oberg |
| 4,845,311 | A | 7/1989 | Schreiber et al. |
| 5,184,095 | A | 2/1993 | Hanz et al. |
| 5,608,591 | A | 3/1997 | Klaassen |
| 5,717,547 | A | 2/1998 | Young |
| 5,737,152 | A | 4/1998 | Balakrishnan |
| 5,754,369 | A | 5/1998 | Balakrishnan |
| 5,771,568 | A | 6/1998 | Gustafson |
| 5,796,552 | A | 8/1998 | Akin, Jr. et al. |
| 5,805,382 | A | 9/1998 | Lee et al. |
| 5,812,344 | A | 9/1998 | Balakrishnan |
| 5,862,010 | A | 1/1999 | Simmons et al. |
| 5,995,328 | A * | 11/1999 | Balakrishnan ............. 360/245.9 |
| 6,038,102 | A | 3/2000 | Balakrishnan et al. |
| 6,144,981 | A | 11/2000 | Kovacs et al. |
| 6,178,055 | B1 | 1/2001 | Janz |
| 6,219,202 | B1 | 4/2001 | Palmer |
| 6,249,404 | B1 | 6/2001 | Doundakov et al. |

(Continued)

OTHER PUBLICATIONS

Huber et al., "Advanced Interconnect Design for High Data Rate Perpendicular Magnetic Recording", IEEE Transactions on Magnetics, vol. 44, No. 1, pp. 175-180, Jan. 2008.

(Continued)

*Primary Examiner* — Mark Blouin

(57) ABSTRACT

A disk drive suspension assembly has a load beam and a laminated flexure attached to the load beam. The laminated flexure includes a structural layer with a head mounting tongue, and first and second conductive layers. A first dielectric layer is disposed between the structural layer and the first conductive layer, and a second dielectric layer is disposed between the first conductive layer and the second conductive layer. The first conductive layer includes a first plurality of interleaved traces with at least a first conductive trace and a second conductive trace separated by a first lateral intertrace spacing. The second conductive layer includes a second plurality of interleaved traces with at least a third conductive trace and a fourth conductive trace separated by a second lateral intertrace spacing. The fourth conductive trace overlies the first lateral intertrace spacing and the first conductive trace underlies the second lateral intertrace spacing.

20 Claims, 5 Drawing Sheets

(56) References Cited

U.S. PATENT DOCUMENTS

| | | |
|---|---|---|
| 6,275,358 B1 | 8/2001 | Balakrishnan et al. |
| 6,331,919 B1 | 12/2001 | Klaassen et al. |
| 6,356,113 B1 | 3/2002 | Contreras et al. |
| 6,369,987 B1 | 4/2002 | Khan et al. |
| 6,414,820 B1 | 7/2002 | Coon et al. |
| 6,424,499 B1 * | 7/2002 | Balakrishnan et al. .... 360/245.9 |
| 6,424,500 B1 | 7/2002 | Coon et al. |
| 6,487,048 B1 | 11/2002 | Dunn |
| 6,490,112 B1 | 12/2002 | Ranmuthu et al. |
| 6,493,190 B1 | 12/2002 | Coon |
| 6,603,623 B1 | 8/2003 | Fontana, Jr. et al. |
| 6,608,736 B1 | 8/2003 | Klaassen et al. |
| 6,700,748 B1 | 3/2004 | Cowles et al. |
| 6,714,385 B1 | 3/2004 | Even et al. |
| 6,762,913 B1 | 7/2004 | Even et al. |
| 6,891,700 B2 | 5/2005 | Shiraishi et al. |
| 6,900,967 B1 | 5/2005 | Coon et al. |
| 6,963,471 B2 | 11/2005 | Arai et al. |
| 6,975,488 B1 | 12/2005 | Kulangara et al. |
| 7,019,959 B2 | 3/2006 | Chua |
| 7,092,215 B2 | 8/2006 | Someya et al. |
| 7,142,073 B2 | 11/2006 | Kim et al. |
| 7,180,011 B1 | 2/2007 | Hall et al. |
| 7,286,325 B2 | 10/2007 | Hernandez et al. |
| 7,325,294 B2 | 2/2008 | Zhou |
| 7,359,149 B2 | 4/2008 | Kiyono et al. |
| 7,595,963 B1 | 9/2009 | Chen et al. |
| 7,729,079 B1 | 6/2010 | Huber |
| 7,832,082 B1 | 11/2010 | Hentges et al. |
| 7,986,494 B2 | 7/2011 | Pro |
| 7,986,495 B2 | 7/2011 | Kamei et al. |
| 8,094,413 B1 | 1/2012 | Hentges et al. |
| 8,111,483 B2 | 2/2012 | Arai |
| 8,154,827 B2 | 4/2012 | Contreras et al. |
| 8,169,746 B1 | 5/2012 | Rice et al. |
| 8,233,240 B2 | 7/2012 | Contreras et al. |
| 8,289,656 B1 | 10/2012 | Huber |
| 8,462,466 B2 | 6/2013 | Huber |
| 8,467,151 B1 | 6/2013 | Huber |
| 8,488,279 B1 | 7/2013 | Pan et al. |
| 8,665,564 B2 * | 3/2014 | Zhou et al. ................ 360/245.9 |
| 2004/0252413 A1 | 12/2004 | Nishiyama |
| 2005/0180053 A1 | 8/2005 | Dovek et al. |
| 2005/0280944 A1 | 12/2005 | Yang et al. |
| 2006/0044695 A1 | 3/2006 | Erpelding |
| 2006/0092572 A1 | 5/2006 | Kiyono |
| 2006/0152854 A1 | 7/2006 | Arya et al. |
| 2006/0173343 A1 | 8/2006 | Guo et al. |
| 2007/0178766 A1 | 8/2007 | Banerjee et al. |
| 2007/0195446 A1 | 8/2007 | Yun |
| 2008/0055788 A1 | 3/2008 | Nagai |
| 2008/0273269 A1 | 11/2008 | Pro |
| 2010/0157457 A1 | 6/2010 | Contreras et al. |
| 2011/0019311 A1 | 1/2011 | Greminger et al. |
| 2011/0051292 A1 | 3/2011 | Huber |
| 2011/0157750 A1 | 6/2011 | Zhu et al. |
| 2012/0160538 A1 * | 6/2012 | Contreras et al. ............ 174/115 |
| 2012/0160548 A1 | 6/2012 | Contreras et al. |

OTHER PUBLICATIONS

Klaassen et al., "Writing At High Data Rates", Journal of Applied Physics, vol. 93, No. 10, pp. 6450-6452, May 2003.

Matthaei et al. "Multiplexer Design", Microwave Filters, Impedance-Matching Networks, and Coupling Structures. Artech House Books, 1980. Ch.16.

Scanlan et al. "Microwave Allpass Networks—Part I and Part II", IEEE Transactions on Microwave Theory and Techniques, vol. 16, No. 2, Feb. 1968, p. 62-79.

Yue Ping Zhang et al., "Dual-Band Microstrip Bandpass Filter Using Stepped-Impedance Resonators With New Coupling Schemes", IEEE Transactions on Microwave Theory and Techniques, vol. 54, No. 10, pp. 3779-3785, Oct. 2006.

* cited by examiner

DISK DRIVE SUSPENSION ASSEMBLY WITH FLEXURE HAVING DUAL CONDUCTIVE LAYERS WITH STAGGERED TRACES

CROSS REFERENCE TO RELATED APPLICATION

This application claims priority to provisional U.S. Patent Application Ser. No. 61/869,165, filed on Aug. 23, 2013, which is incorporated herein in its entirety.

BACKGROUND

Information storage devices are used to retrieve and/or store data in computers and other consumer electronics devices. A magnetic hard disk drive is an example of an information storage device that includes one or more heads that can both read and write, but other information storage devices also include heads—sometimes including heads that cannot write.

In a modern magnetic hard disk drive device, each head is a sub-component of a head gimbal assembly (HGA) that typically includes a suspension assembly with a laminated flexure to carry the electrical signals to and from the head. The HGA, in turn, is a sub-component of a head stack assembly (HSA) that typically includes a plurality of HGAs, an actuator, and a flexible printed circuit. The plurality of HGAs are attached to various arms of the actuator, and each of the laminated flexures of the HGAs has a flexure tail that is electrically connected to the HSA's flexible printed circuit.

Modern laminated flexures typically include conductive copper traces that are isolated from a stainless steel structural layer by a polyimide dielectric layer. So that the signals from/to the head can reach the flex cable on the actuator body, each HGA flexure includes a flexure tail that extends away from the head along the actuator arm and ultimately attaches to the flexible printed circuit adjacent the actuator body. That is, the flexure includes traces that extend from adjacent the head and terminate at electrical connection points at the flexible printed circuit. The flexible printed circuit includes electrical conduits that correspond to the electrical connection points of the flexure tail.

Since the conductive traces of the flexure are separated from the structural layer by a dielectric layer, electrical capacitance exists between the conductive traces and the structural layer. Electrical capacitance also exists between one conductive trace and another adjacent conductive trace. Such electrical capacitances affect the capacitive reactance and impedance of the conductive traces, and hence the bandwidth of the conductive traces.

Heat Assisted Magnetic Recording (HAMR) uses a pulsed laser diode as a heat source on the head. In HAMR applications, the conductive traces connecting the head and the preamplifier of the flexible printed circuit of the HSA require at least two high bandwidth transmission paths: the magnetic write path and the pulsed laser path. Other conductive traces may carry signals from the read transducer (e.g. a tunneling magneto-resistive sensor), to a head-based microactuator, and/or to a resistive heater for dynamic flying height control. Hence, there is a need in the art for a flexure design that can provide required transmission paths on the flexure tail for modern HAMR or non-HAMR applications, without the flexure tail becoming too wide, and with the transmission paths having adequately high bandwidth without excessive crosstalk or excessive impedance.

DETAILED DESCRIPTION OF EXAMPLE EMBODIMENTS

Figure 1:
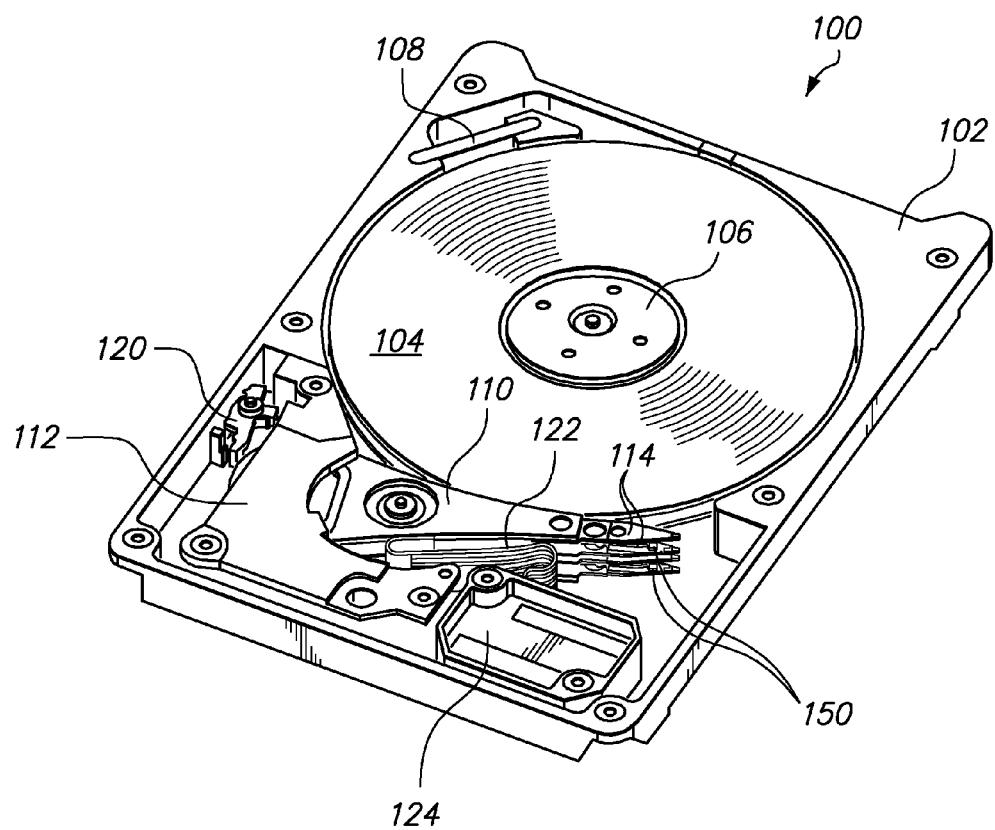
FIG. 1 is a top perspective view of a disk drive capable of including an embodiment of the present invention.

FIG. 1 is a top perspective view of a disk drive 100 capable of including an embodiment of the present invention. The disk drive 100 includes a disk drive base 102 and two annular magnetic disks 104. The disk drive 100 further includes a spindle 106, rotably mounted on the disk drive base 102, for rotating the disks 104. The rotation of the disks 104 establishes air flow through recirculation filter 108. In other embodiments, disk drive 100 may have only a single disk, or alternatively, more than two disks.

The disk drive 100 further includes an actuator 110 that is rotably mounted on disk drive base 102. Voice coil motor 112 rotates the actuator 110 through a limited angular range so that at least one head gimbal assembly (HGA) 114 is desirably positioned relative to one or more tracks of information on a corresponding one of the disks 104. In the embodiment of FIG. 1, the actuator 110 includes three arms upon which four HGAs 114 are attached, each corresponding to a surface of one of the two disks 104. However in other embodiments fewer or more HGAs may be included depending on the number of disks 104 that are included and whether the disk drive 100 is depopulated. Each HGA 114 includes a head 150 for reading and writing data from and to one of the disks 104. The actuator 110 may occasionally be latched at an extreme angular position within the limited angular range, by latch 120. Electrical signals to/from the HGAs 114 are carried to other drive electronics via a flexible printed circuit that includes a flex cable 122 (preferably including a preamplifier circuit) and flex cable bracket 124.

Figure 2A:
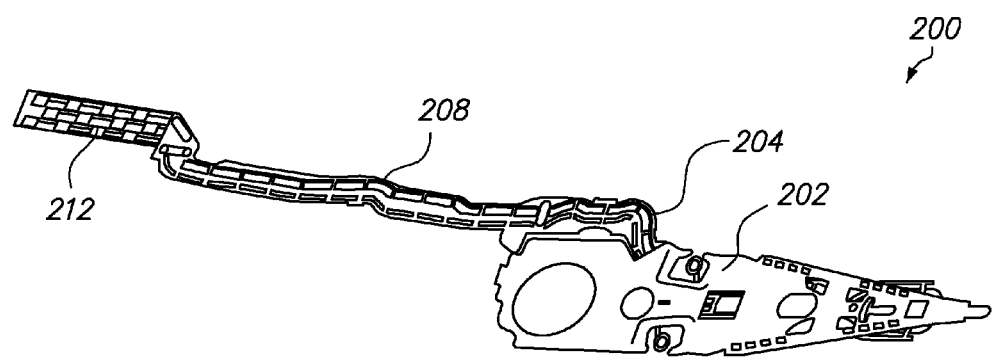
FIGS. 2A and 2B depict top and underside perspective views, respectively, of a suspension assembly according to an embodiment of the present invention.
Figure 2B:
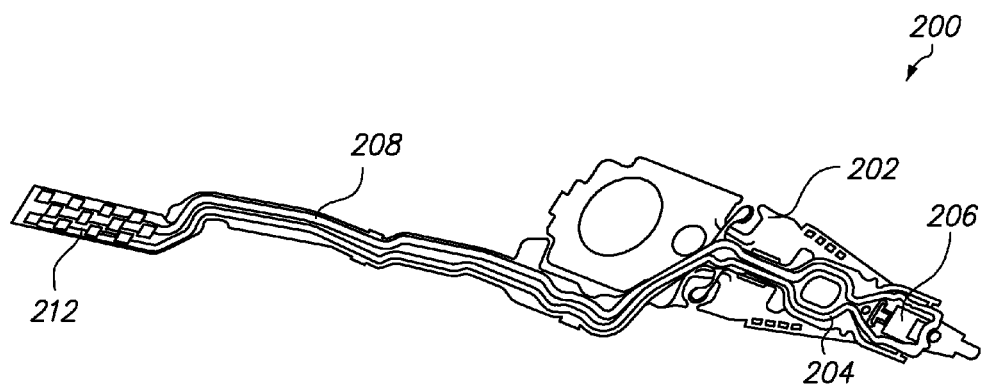

FIGS. 2A and 2B depict the top and underside, respectively, of a suspension assembly 200 according to an embodiment of the present invention. Now referring additionally to FIGS. 2A and 2B, the suspension assembly 200 is designed to support a head (e.g. head 150) after it is assembled into a HGA. However, before assembly into an HGA, the suspension assembly 200 does not include a head, and suspension assemblies may be manufactured and sold without including a head. The suspension assembly 200 includes a load beam 202. A purpose of the load beam 202, once the suspension assembly 200 is included in a HGA, is to provide vertical compliance for the head 150 to follow vertical undulation of the surface of a disk 104 as it rotates, and to preload the head 150 against the surface of the disk 104 as it rotates, by a preload force that is commonly referred to as the "gram load."

The suspension assembly 200 also includes a laminated flexure 204 attached to the load beam 202. For example, a structural layer of the laminated flexure 204 may be spot welded to the load beam 202. When the suspension assembly 200 is included in a HGA, the head 150 is attached to a head mounting surface of a tongue 206 of the laminated flexure 204. A first purpose of the laminated flexure 204 is to provide compliance for the head 150 to follow pitch and roll angular undulations of the surface of disk 104 as it rotates, while restricting relative motion between the head 150 and the load beam 202 in the lateral direction and about a yaw axis. A second purpose of the laminated flexure 204 is to provide a plurality of electrical paths to the head 150 to facilitate signal transmission to/from the head 150.

For that second purpose, the laminated flexure 204 may include a plurality of electrically conductive (e.g. copper) traces. So that the signals from/to the head 150 can reach the flex cable 122 adjacent the actuator 110, the laminated flexure 204 may include a flexure tail 208 that extends away from the head 150 along the actuator 110 and ultimately connects to the flex cable 122 adjacent the actuator 110. That is, the laminated flexure 204 may include conductive traces that extend from adjacent the head 150 and terminate at electrical connection points at a terminus region 212 of the flexure tail 208. As seen from FIGS. 1, 2A, and 2B, the flexure tail 208 is a distinct and smaller component, as compared with flex cable 122. Methods of electrical connection of the flexure tail 208 to the flex cable 122 include ultrasonic tab bonding, solder reflow, anisotropic conductive film bonding, or solder jet bond (SJB).

Figure 2C:
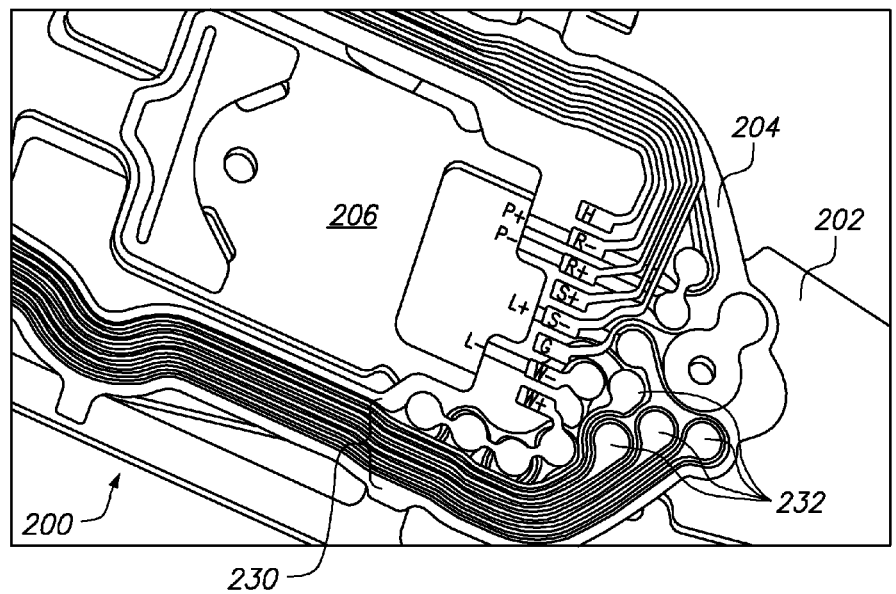
FIG. 2C is a close-up bottom perspective view of a tongue portion of a laminated flexure according to an embodiment of the present invention.

FIG. 2C is a close-up perspective view of a portion of the HGA 200, in the region of the head mounting surface of the tongue 206. Now referring additionally to FIG. 2C, the laminated flexure 204 may include a plurality of conductive traces 230, electrically separated from underlying layers by a dielectric layer. The laminated flexure 204 may also include a plurality of conductive vias 232 through which the plurality of conductive layers may be connected to traces in an underlying layer and/or to each other. For example, the conductive traces 230 may carry the write signal to the head and are preferably interleaved (e.g. adjacent traces may alternate in order W+, W−, W+, W−). The conductive vias 232 may comprise a conductive metal such as copper or gold, for example. Also, an optional insulative cover layer may cover the uppermost layer of conductive traces 230 except where their terminals must be exposed for electrical connection to the head.

Interleaving can reduce the impedance and increase the bandwidth of a transmission line. In the present context, a transmission line is considered to be "interleaved" if it includes a first conductor that is split into a first group of common conductors, each being connected in parallel at both the proximate and distal ends of the transmission line, and if it also includes a second conductor that is split into a second group of common conductors, each being connected in parallel at both the proximate and distal ends of the transmission line, and if those of the first group of common conductors are interspersed between those of the second group of common conductors without shorting with (being directly connected to) the second group of common conductors. For example, if the conductive traces 230 are interleaved and carry the write signal, then the W+ traces will be laterally interspersed between the W− traces without shorting with (touching or being directly connected to) the W− traces.

Figure 2D:
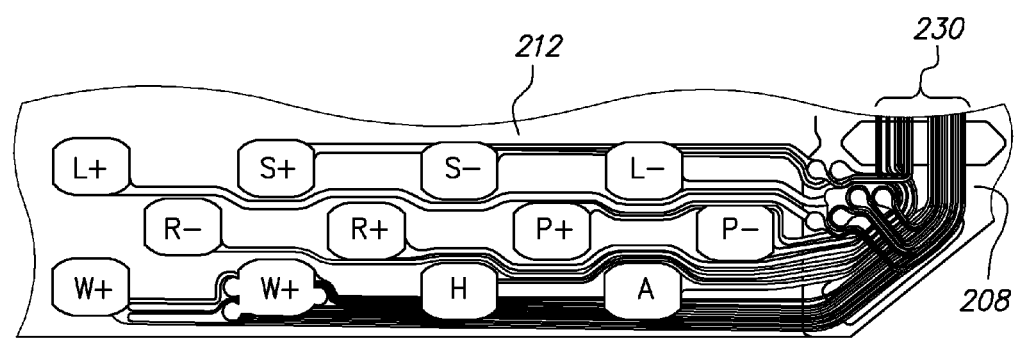
FIG. 2D is a close-up plan view of a laminated flexure tail according to an embodiment of the present invention.

FIG. 2D is a close-up plan view of a terminus region 212 of the flexure tail 208. Note that the conductive traces 230 may be interleaved. For example, the subset of conductive traces 230 that carry the write signal to the head may be arranged on the flexure tail 208 in alternating order (e.g. W+, W−, W+, W−), so that W− traces lie between W+ traces in the plan view, and vice versa.

Figure 3A:
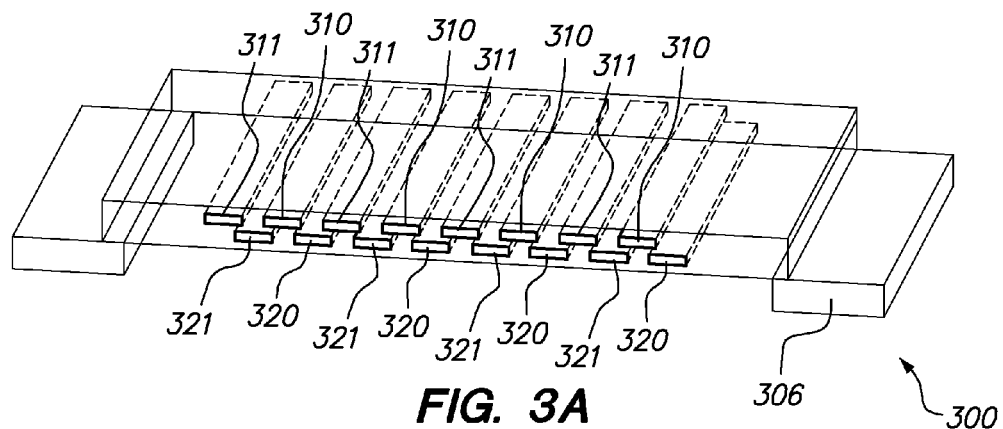
FIGS. 3A and 3B depict perspective cross-sectional views of a laminated flexure according to an embodiment of the present invention, at a midpoint and at a terminus, respectively.
Figure 3B:
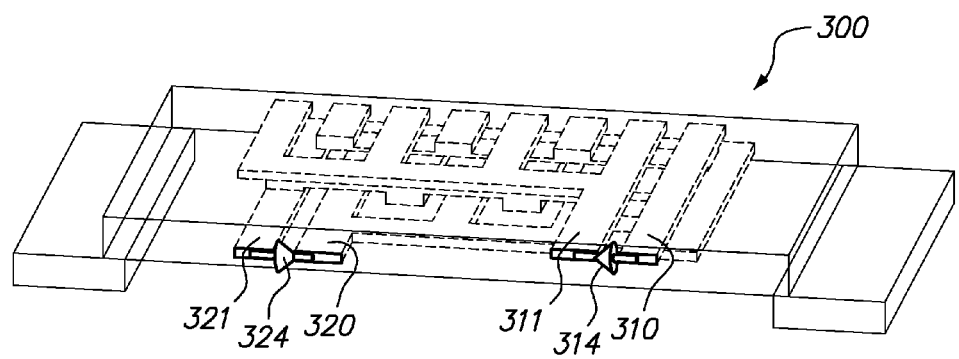

FIGS. 3A and 3B depict perspective cross-sectional views of a laminated flexure 300 at a midpoint and at a terminus, respectively. In the example embodiment of FIG. 3A, the upper row of conductive traces 310, 311 carry the signal to drive the pulsed laser, with eight interleaved traces (four outgoing traces 310 interleaved with four return traces 311). The symbol 314 represents the circuit providing the signal to drive the pulsed laser. The lower row of conductive traces 320, 321 carry the signal to drive the magnetic writer of the head, with eight interleaved traces (four outgoing traces 320 interleaved with four return traces 321). The symbol 324 represents the circuit providing the signal to drive the magnetic writer of the head.

FIGS. 3A and 3B depict an example of how alternate conductive traces 310, 311 of the upper row (e.g. pulsed laser driving signal transmission traces) may be interleaved near a terminus of the laminated flexure 300, and how alternate conductive traces 320, 321 of the lower row (e.g. write signal transmission traces) may be interleaved near a terminus of the laminated flexure 300. Such an interleaved arrangement may provide substantial advantages in terms of electrical properties, such as balancing the capacitance of each trace with respect to the structural layer, changing inter-trace capacitance, increasing bandwidth, and electromagnetic noise shielding and common mode rejection or cancellation.

In the embodiment of FIGS. 3A and 3B, the upper row of conductive traces 310, 311 is staggered (i.e. laterally offset) from the lower row of conductive traces 320, 321, so that the spacings or gaps between the upper conductive traces 310, 311 overlie and are aligned with respective ones of the lower conductive traces 320, 321. Likewise, the spacings or gaps between the lower conductive traces 320, 321 underlie and are aligned with respective ones of the upper conductive traces 310, 311.

In the foregoing context, "aligned with" means that a bisecting longitudinal centerline of a conductive trace 310, 311 or 320, 321 is aligned with a bisecting longitudinal centerline of the spacing or gap between the traces of the other layer, within a tolerance of ±5 microns. Also, to "overlie" in this context does not imply direct contact, but rather that the largest major surface of an upper conductive trace 310, 311 overlaps with the lateral spacing or gap between two of the lower row of conductive traces 320, 321, while being vertically spaced by a dielectric material. Likewise, to "underlie" in this context does not imply direct contact, but rather that the lateral spacing or gap between two of the upper row of conductive traces 310, 311 overlaps with the largest major surface of a corresponding lower conductive trace 320, 321 while being vertically spaced by a dielectric material.

As a result of the staggering of one layer of conductive traces relative to the other shown in FIG. 3A, each single-layer group of interleaved traces sees the other layer, which is laterally offset, as a slotted ground plane. In certain embodiments, this can advantageously increase isolation between the two corresponding high bandwidth signal paths without adding additional metallic layers. Therefore, with only two conductive trace layers, one may obtain two high bandwidth signal paths, without necessarily having an additional ground plane layer.

In the embodiment of FIGS. 3A and 3B, the first and second conductive layers, from which the first and second rows of conductive traces 310, 311 and 320, 321 are patterned, respectively, may comprise copper and have a thickness in the range of 2.5 microns to 18 microns, for example. The laminated flexure 300 may also include a structural layer 306, which may comprise stainless steel and have a thickness in the range of 10 microns to 20 microns, for example.

In the embodiment of FIGS. 3A and 3B, the laminated flexure 300 also includes a first dielectric layer disposed between the first row of conductive traces 310, 311 and the second row of conductive traces 320, 321. The laminated flexure 300 also includes a second dielectric layer disposed between the structural layer 306 and the second conductive layer that includes the second row of conductive traces 320, 321. The first and second dielectric layers may each comprise polyimide and have a thickness in the range of 5 microns to 25 microns, for example.

Figure 4:
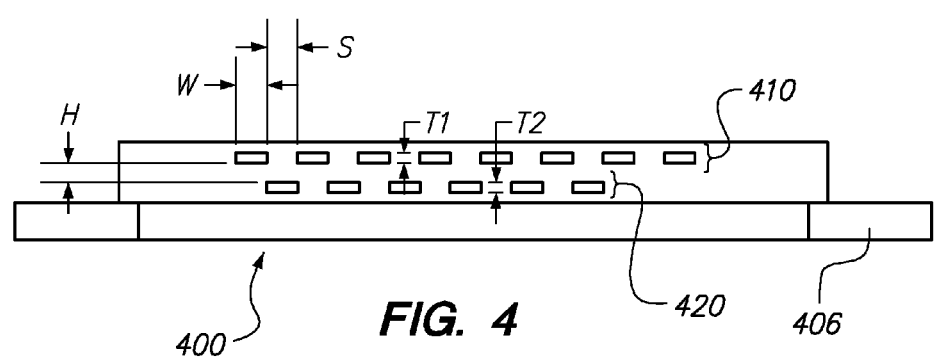
FIG. 4 is a cross-sectional view of a laminated flexure according to another embodiment of the present invention.

FIG. 4 depicts a cross-sectional view of a laminated flexure 400 according to another embodiment of the present invention. In the example embodiment of FIG. 4, the upper row of conductive traces 410 carry the signal to drive the pulsed laser, with eight interleaved traces (four outgoing traces interleaved with four return traces). The lower row of conductive traces 420 carry the signal to drive the magnetic writer of the head, with six interleaved traces (three outgoing traces interleaved with three return traces). The laminated flexure 400 may also include a structural layer 406, which may comprise stainless steel and have a thickness in the range of 10 microns to 20 microns, for example. If the structural layer 406 comprises a conductive material, it may be windowed as desired to reduce electrical capacitance with overlying conductive traces.

In the embodiment of FIG. 4, the upper row of conductive traces 410 is staggered (i.e. laterally offset) from the lower row of conductive traces 420, so that the spacings or gaps between the upper conductive traces 410 overlie and are aligned with respective ones of the lower conductive traces 420. Likewise, the spacings or gaps between the lower conductive traces 420 underlie and are aligned with respective ones of the upper conductive traces 410. As a result of the staggering of one layer of conductive traces relative to the other shown in FIG. 4, each single-layer group of interleaved traces sees the other layer, which is laterally offset, as a slotted ground plane. In certain embodiments, this can advantageously increase isolation between the two corresponding high bandwidth signal paths without adding additional metallic layers.

In the example embodiment of FIG. 4, the lateral width W of each of the conductive traces 410, 420 is approximately equal to the lateral width S of the spacing or gap between conductive traces 410, 420. For example, W and S may each be in the range of 5 to 30 microns. In the embodiment of FIG. 4, the laminated flexure 400 also includes a dielectric layer disposed between the first row of conductive traces 410 and the second row of conductive traces 420. In certain embodiments, the thickness H of the dielectric layer between the upper row of conductive traces 410 and the lower row of conductive traces 420 is preferably in the range of 5 microns to 25 microns.

In the embodiment of FIG. 4, the first and second conductive layers, from which the first and second rows of conductive traces 410, 420 are patterned, respectively, may comprise copper. A thickness T1 of the first conductive layer, from which the first row of conductive traces 410 is patterned, may be in the range of 2.5 microns to 18 microns, for example. A thickness T2 of the second conductive layer, from which the second row of conductive traces 420 is patterned, is not necessarily equal to T1 but may preferably also be in the range of 2.5 microns to 18 microns, in certain embodiments. In certain embodiments T1 may be purposefully different from T2 to manage relative impedance or bandwidth of the signal paths.

Figure 5:
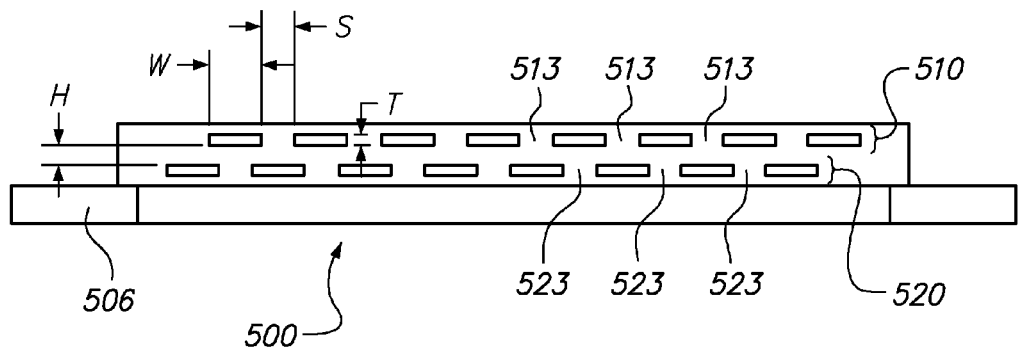
FIG. 5 is a cross-sectional view of a laminated flexure, according to another embodiment of the present invention.

FIG. 5 depicts a cross-sectional view of a laminated flexure 500 according to another embodiment of the present invention. In the example embodiment of FIG. 5, the upper row of conductive traces 510 carry the signal to drive the pulsed laser, with eight interleaved traces (four outgoing traces interleaved with four return traces) separated by spacings or gaps 513. The lower row of conductive traces 520 carry the signal to drive the magnetic writer of the head, with eight interleaved traces (four outgoing traces interleaved with four return traces) separated by spacings or gaps 523. The laminated flexure 500 may also include a structural layer 506, which may comprise stainless steel and have a thickness in the range of 10 microns to 20 microns, for example. If the structural layer 506 comprises a conductive material, it may be windowed as desired to reduce electrical capacitance with overlying conductive traces.

In the embodiment of FIG. 5, the upper row of conductive traces 510 is staggered (i.e. laterally offset) from the lower row of conductive traces 520, so that the spacings or gaps 513 between the upper conductive traces 510 overlie and are aligned with respective ones of the lower conductive traces 520. Likewise, the spacings or gaps 523 between the lower conductive traces 520 underlie and are aligned with respective ones of the upper conductive traces 510. As a result of the staggering of one layer of conductive traces relative to the other shown in FIG. 5, each single-layer group of interleaved traces sees the other layer, which is laterally offset, as a slotted ground plane. In certain embodiments, this can advantageously increase isolation between the two corresponding high bandwidth signal paths without adding additional metallic layers.

In the example embodiment of FIG. 5, the lateral width W of each of the conductive traces 510, 520 is optionally greater than the lateral width S of the spacing or gaps 513, 523 between conductive traces 510, 520 respectively. For example, W may be in the range of 5 to 30 microns. Note that although in FIG. 5 the widths of the interleaved traces are shown to be equal, they need not be. In certain embodiments, unequal widths may be preferred. In the embodiment of FIG. 5, the first and second conductive layers, from which the first and second rows of conductive traces 510, 520 are patterned, respectively, may comprise copper and have a thickness T in the range of 2.5 microns to 18 microns, for example. In the embodiment of FIG. 5, the laminated flexure 500 also includes a dielectric layer disposed between the first row of conductive traces 510 and the second row of conductive traces 520. In certain embodiments, the thickness H of the dielectric layer is preferably in the range of 5 microns to 25 microns.

Figure 6:
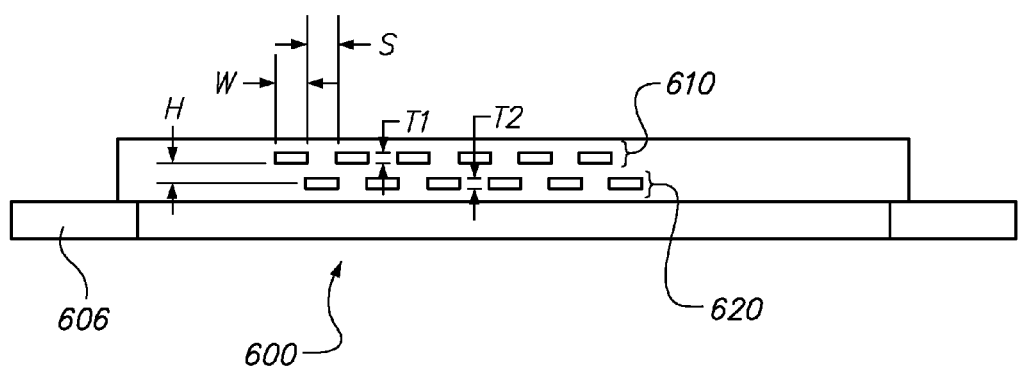
FIG. 6 is a cross-sectional view of a laminated flexure, according to another embodiment of the present invention.

FIG. 6 depicts a cross-sectional view of a laminated flexure 600 according to another embodiment of the present invention. In the example embodiment of FIG. 6, the upper row of conductive traces 610 carry the signal to drive the magnetic writer of the head, with six interleaved traces (three outgoing traces interleaved with three return traces). The lower row of conductive traces 620 carry the signal to drive the pulsed laser, with six interleaved traces (three outgoing traces interleaved with three return traces). The laminated flexure 600 may also include a structural layer 606, which may comprise stainless steel and have a thickness in the range of 10 microns to 20 microns, for example. If the structural layer 606 comprises a conductive material, it may be windowed as desired to reduce electrical capacitance with overlying conductive traces.

In the embodiment of FIG. 6, the upper row of conductive traces 610 is staggered (i.e. laterally offset) from the lower row of conductive traces 620, so that the spacings or gaps between the upper conductive traces 610 overlie and are aligned with respective ones of the lower conductive traces 620. Likewise, the spacings or gaps between the lower conductive traces 620 underlie and are aligned with respective ones of the upper conductive traces 610. As a result of the staggering of one layer of conductive traces relative to the other shown in FIG. 6, each single-layer group of interleaved traces sees the other layer, which is laterally offset, as a slotted ground plane. In certain embodiments, this can advantageously increase isolation between the two corresponding high bandwidth signal paths without adding additional metallic layers.

In the example embodiment of FIG. 6, the lateral width W of each of the conductive traces 610, 620 is approximately equal to the lateral width S of the spacing or gap between conductive traces 610, 620. For example, W and S may each be in the range of 5 to 30 microns. In the embodiment of FIG. 6, the laminated flexure 600 also includes a dielectric layer disposed between the first row of conductive traces 410 and the second row of conductive traces 620. In certain embodiments, the thickness H of the dielectric layer between the upper row of conductive traces 610 and the lower row of conductive traces 620 is preferably in the range of 5 microns to 25 microns.

In the embodiment of FIG. 6, the first and second conductive layers, from which the first and second rows of conductive traces 610, 620 are patterned, respectively, may comprise copper. A thickness T1 of the first conductive layer, from which the first row of conductive traces 610 is patterned, may be in the range of 2.5 microns to 18 microns, for example. A thickness T2 of the second conductive layer, from which the second row of conductive traces 620 is patterned, is not necessarily equal to T1 but may preferably also be in the range of 2.5 microns to 18 microns, in certain embodiments. In certain embodiments T1 may be purposefully different from T2 to manage relative impedance or bandwidth of the signal paths.

Figure 7:
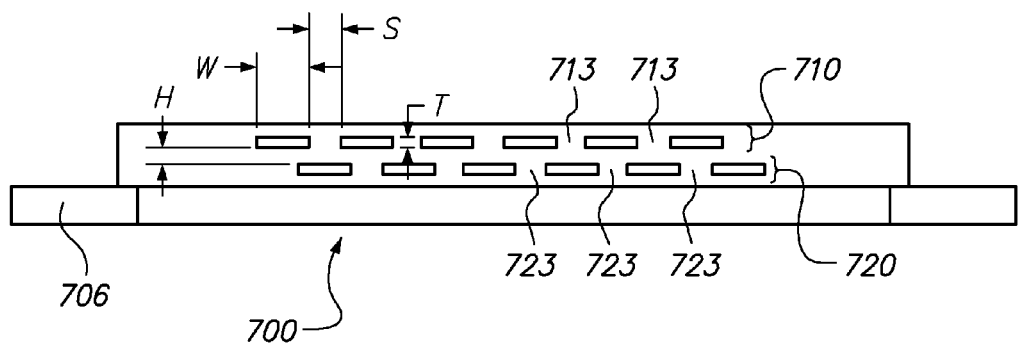
FIG. 7 is a cross-sectional view of a laminated flexure, according to another embodiment of the present invention.

FIG. 7 depicts a cross-sectional view of a laminated flexure 700 according to another embodiment of the present invention. In the example embodiment of FIG. 7, the upper row of conductive traces 710 carry the signal to drive the pulsed laser, with six interleaved traces (three outgoing traces interleaved with three return traces) separated from each other by spacings or gaps 713. The lower row of conductive traces 720 carry the signal to drive the magnetic writer of the head, with six interleaved traces (three outgoing traces interleaved with three return traces) separated from each other by spacings or gaps 723. The laminated flexure 700 may also include a structural layer 706, which may comprise stainless steel and have a thickness in the range of 10 microns to 20 microns, for example. If the structural layer 706 comprises a conductive material, it may be windowed as desired to reduce electrical capacitance with overlying conductive traces.

In the embodiment of FIG. 7, the upper row of conductive traces 710 is staggered (i.e. laterally offset) from the lower row of conductive traces 720, so that the spacings or gaps 713 between the upper conductive traces 710 overlie and are aligned with respective ones of the lower conductive traces 720. Likewise, the spacings or gaps 723 between the lower conductive traces 720 underlie and are aligned with respective ones of the upper conductive traces 710.

In the foregoing context, "aligned with" means that a bisecting longitudinal centerline of a conductive trace 710 is aligned with a bisecting longitudinal centerline of the spacing or gap 723 between the traces 720, within a tolerance of ±5 microns. Likewise, a bisecting longitudinal centerline of a conductive trace 720 may preferably be aligned with a bisecting longitudinal centerline of the spacing or gap 713 between the traces 710, within a tolerance of ±5 microns. Also, to "overlie" in this context does not imply direct contact, but rather that the largest major surface of an upper conductive trace 710 overlaps with the lateral spacing or gap between two of the lower row of conductive traces 720, while being vertically spaced by a dielectric material. Likewise, to "underlie" a spacing or gap in this context does not imply direct contact, but rather that the lateral spacing or gap 713 between two of the upper row of conductive traces 710 overlaps with the largest major surface of a corresponding lower conductive trace 720, while being vertically spaced by a dielectric material.

As a result of the staggering of one layer of conductive traces relative to the other shown in FIG. 7, each single-layer group of interleaved traces sees the other layer, which is laterally offset, as a slotted ground plane. In certain embodiments, this can advantageously increase isolation between the two corresponding high bandwidth signal paths without adding additional metallic layers.

In the example embodiment of FIG. 7, the lateral width W of each of the conductive traces 710, 720 is optionally greater than the lateral width S of the spacing or gap 713, 723 between conductive traces 710, 720 respectively. For example, W may be in the range of 5 to 30 microns. Note that although in FIG. 7 the widths of the interleaved traces are shown to be equal, they need not be. In certain embodiments, unequal widths may be preferred. In the embodiment of FIG. 7, the first and second conductive layers, from which the first and second rows of conductive traces 710, 720 are patterned, respectively, may comprise copper and have a thickness T in the range of 2.5 microns to 18 microns, for example. In the embodiment of FIG. 7, the laminated flexure 700 also includes a dielectric layer disposed between the first row of conductive traces 710 and the second row of conductive traces 720. In certain embodiments, the thickness H of the dielectric layer is preferably in the range of 5 microns to 25 microns.

In the foregoing specification, the invention is described with reference to specific exemplary embodiments, but those skilled in the art will recognize that the invention is not limited to those. It is contemplated that various features and aspects of the invention may be used individually or jointly and possibly in a different environment or application. The specification and drawings are, accordingly, to be regarded as illustrative and exemplary rather than restrictive. For example, the word "preferably," and the phrase "preferably but not necessarily," are used synonymously herein to consistently include the meaning of "not necessarily" or optionally. "Comprising," "including," and "having," are intended to be open-ended terms.

What is claimed is:

1. A disk drive comprising:
   a disk drive base,
   an actuator pivotably attached to the disk drive base, the actuator including an arm; and
   a head gimbal assembly (HGA) attached to the actuator arm, the HGA including a head, and a suspension assembly that comprises a load beam and a laminated flexure attached to the load beam, the laminated flexure including:
   a structural layer having a head mounting tongue to which the head is bonded;

a first conductive layer including a first plurality of interleaved traces, and a second conductive layer including a second plurality of interleaved traces;
a first dielectric layer disposed between the structural layer and the first conductive layer; and
a second dielectric layer disposed between the first conductive layer and the second conductive layer;
wherein the first plurality of interleaved traces includes at least a first conductive trace and a second conductive trace separated by a first lateral intertrace spacing, and the second plurality of interleaved traces includes at least a third conductive trace and a fourth conductive trace separated by a second lateral intertrace spacing; and
wherein the fourth conductive trace overlies the first lateral intertrace spacing and the first conductive trace underlies the second lateral intertrace spacing.

2. The disk drive of claim 1 wherein each of the first, second, third, and fourth conductive traces, and each of the first and second lateral intertrace spacings, has a lateral width in the range of 5 microns to 30 microns.

3. The disk drive of claim 1 wherein the fourth conductive trace is aligned with the first lateral intertrace spacing and the first conductive trace is aligned with the second lateral intertrace spacing.

4. The disk drive of claim 1 wherein a lateral width of the first conductive trace equals a lateral width of the second lateral intertrace spacing.

5. The disk drive of claim 1 wherein a lateral width of the first conductive trace exceeds a lateral width of the second lateral intertrace spacing.

6. The disk drive of claim 1 wherein each of the first and second dielectric layers comprises polyimide and has a thickness in the range of 5 microns to 25 microns.

7. The disk drive of claim 1 wherein the first and second conductive traces together carry a writing signal to the head, and the third and fourth conductive traces together carry a laser diode driving signal to the head.

8. The disk drive of claim 1 wherein each of the first and second conductive layers comprises copper and has a thickness in the range of 2.5 microns to 18 microns.

9. A head gimbal assembly (HGA) comprising:
a head; and
a suspension assembly comprising:
  a load beam;
  a laminated flexure attached to the load beam, the laminated flexure including:
    a structural layer having a head mounting tongue to which the head is bonded;
    a first conductive layer including a first plurality of interleaved traces, and a second conductive layer including a second plurality of interleaved traces;
    a first dielectric layer disposed between the structural layer and the first conductive layer; and
    a second dielectric layer disposed between the first conductive layer and the second conductive layer;
    wherein the first plurality of interleaved traces includes at least a first conductive trace and a second conductive trace separated by a first lateral intertrace spacing, and the second plurality of interleaved traces includes at least a third conductive trace and a fourth conductive trace separated by a second lateral intertrace spacing; and
    wherein the fourth conductive trace overlies and is aligned with the first lateral intertrace spacing and the first conductive trace underlies and is aligned with the second lateral intertrace spacing.

10. The HGA of claim 9 wherein each of the first, second, third, and fourth conductive traces has a lateral width in the range of 5 microns to 30 microns.

11. The HGA of claim 9 wherein the first and second conductive traces together carry a writing signal to the head, and the third and fourth conductive traces together carry a laser diode driving signal to the head.

12. The HGA of claim 9 wherein a lateral width of the first conductive trace equals a lateral width of the second lateral intertrace spacing.

13. The HGA of claim 9 wherein a lateral width of the first conductive trace exceeds a lateral width of the second lateral intertrace spacing.

14. A suspension assembly comprising:
a load beam;
a laminated flexure attached to the load beam, the laminated flexure including:
  a structural layer that includes a head mounting tongue;
  a first conductive layer including a first plurality of interleaved traces, and a second conductive layer including a second plurality of interleaved traces;
  a first dielectric layer disposed between the structural layer and the first conductive layer; and
  a second dielectric layer disposed between the first conductive layer and the second conductive layer;
  wherein the first plurality of interleaved traces includes at least a first conductive trace and a second conductive trace separated by a first lateral intertrace spacing, and the second plurality of interleaved traces includes at least a third conductive trace and a fourth conductive trace separated by a second lateral intertrace spacing; and
  wherein the fourth conductive trace overlies the first lateral intertrace spacing and the first conductive trace underlies the second lateral intertrace spacing.

15. The suspension assembly of claim 14 wherein each of the first, second, third, and fourth conductive traces, and each of the first and second lateral intertrace spacings, has a lateral width in the range of 5 microns to 30 microns.

16. The suspension assembly of claim 14 wherein the fourth conductive trace is aligned with the first lateral intertrace spacing and the first conductive trace is aligned with the second lateral intertrace spacing.

17. The suspension assembly of claim 14 wherein a lateral width of the first conductive trace equals a lateral width of the second lateral intertrace spacing.

18. The suspension assembly of claim 14 wherein a lateral width of the first conductive trace exceeds a lateral width of the second lateral intertrace spacing.

19. The suspension assembly of claim 14 wherein each of the first and second dielectric layers comprises polyimide and has a thickness in the range of 5 microns to 25 microns.

20. The suspension assembly of claim 14 wherein each of the first and second conductive layers comprises copper and has a thickness in the range of 2.5 microns to 18 microns.

* * * * *